United States Patent [19]

Cook

[11] 4,338,135

[45] Jul. 6, 1982

[54] MICROWAVE CURING OF CEMENTITIOUS MATERIAL

[75] Inventor: Hilbert F. Cook, Dallas, Tex.

[73] Assignee: Texas Industries, Inc., Dallas, Tex.

[21] Appl. No.: 251,053

[22] Filed: Apr. 6, 1981

[51] Int. Cl.³ .............................................. C04B 7/02
[52] U.S. Cl. ...................... 106/97; 106/98; 264/22; 264/23; 264/25; 264/26; 264/DIG. 43
[58] Field of Search .................... 106/97, 98, 120; 264/22, 23, 25, 26, DIG. 43

[56] References Cited

U.S. PATENT DOCUMENTS

| | | | |
|---|---|---|---|
| 3,192,291 | 6/1965 | D'Onofrio | 264/26 |
| 3,427,009 | 2/1969 | Shute | 264/82 |
| 3,957,937 | 5/1976 | Lovell | 264/82 |
| 4,043,380 | 8/1977 | Valentine | 264/25 |
| 4,099,337 | 7/1978 | Wauhop, Jr. | 264/82 |

OTHER PUBLICATIONS

Committee Report on the Accelerated Curing of Concrete at Atmospheric Pressure—State of the Art, ACI Journal, Nov.–Dec. 1980, pp. 429–448, Report No. ACI 517.2R-80.

*Primary Examiner*—James Poer
*Attorney, Agent, or Firm*—Richards, Harris & Medlock

[57] ABSTRACT

A method for manufacturing cementitious products are provided in which microwave radiation energy is applied to cementitious products that have been at least partially cured by a moist curing method such as low pressure steam, water vapor or autoclave curing. Microwave radiation energy applied is sufficient to provide rapid cure completion and drying of the cementitious material.

11 Claims, No Drawings

MICROWAVE CURING OF CEMENTITIOUS MATERIAL

TECHNICAL FIELD

This invention relates to cementitious material. In a more particular aspect, the invention relates to curing and drying cementitious material with microwave energy wherein the material has been partially cured by conventional moist curing methods, such as low pressure steam curing.

BACKGROUND ART

The curing and drying of cementitious products, such as cementitious concrete materials in the form of blocks, bricks and the like, is an old art dating back many centuries. The development of acceptable strength for such cementitious products is tied to chemical reactions which take place in the cementitious concrete. The primary chemical reactions that take place in such cementitious concrete products are the hydration reactions. The specific hydration reactions depend upon the source of the cement employed and, for the most part, involve four basic hydration reactions. These four basic reactions involve the hydration of (1) tricalcium aluminate, (2) tetracalcium aluminoferrite, (3) tricalcium silicate and (4) dicalcium silicate. Since the four reactions are hydration reactions, water must be mixed with or supplied to the cementitious concrete.

As used in the art, the term "curing" as applied to concrete products generally refers to the period between the molding operation and the time when the hydration reactions have been substantially completed during which hardening of the cement takes place through the chemical reactions between the cement and water. Regardless of the curing technique employed, the curing parameters of time, temperature and moisture are the most important and must be suitably balanced so as to maintain the concrete in the moist condition until the cement has properly hydrated or hardened. These parameters depend to some extent upon the selection of the concrete aggregates, the amount of cement used and the desired resulting properties of the concrete products, as is well known to those skilled in the art.

In addition to curing, drying of the cementitious material can also be important, especially in the production of cementitious block and brick. Generally, prior to the time the block or brick is able to be strapped together for shipping, it is dried and drying can be considered part of the overall "curing" process.

The oldest curing technique is natural curing wherein the concrete products are subjected to atmospheric conditions existing at the time the products are formed without special heating or wetting. The major drawbacks of natural curing are that the moisture needed for hydration of the cement is left to chance depending on weather conditions and that the curing process requires several weeks to 28 days. As a consequence and in view of the ever-increasing demand for concrete products, natural curing has for the most part been replaced by accelerated curing techniques.

There are several types of accelerated moist curing techniques currently in use, including vapor curing, low pressure steam curing all of which were free from application of liquid water and autoclave curing. In low pressure steam curing the concrete products to be cured are loaded into a kiln and a sufficient quantity of steam is injected directly into the kiln to heat the internal atmosphere thereof to the desired temperature while maintaining a high degree of saturation thereby providing the combination of heat and moisture which accelerates the hydration and hardening of the cement. Normally, saturated steam at atmospheric pressure is used to attain temperatures on the order of 100° F. to 180° F. or higher. In some instances, additional heat and moisture are directed to the kiln atmosphere by burning a gas and recirculating the products of combustion, with or without the addition of moisture. Vapor and autoclave curing are basically variations of low pressure steam curing.

After the moist curing operation such as with water vapor, low pressure steam, and autoclaving, the kiln, if drying is required and/or desired, is normally exhausted to expel the moisture laden atmosphere in preparation for the drying operation.

Typical drying methods include the use of butane or natural gas fuels for providing elevated temperatures in closed environments containing the cementitious material. The use of oil fired furnaces can result in staining of light-color concrete products. In any event, the forced warm air heating of the products consumes a considerable amount of butane, natural gas or other fuels occupying a considerable amount of time. Therefore, a need exists for a method of accelerated drying of cured cementitious material without utilizing butane, natural gas, oil or similar fuels.

The curing and drying of the block to a point where the block has sufficient strength for subsequent handling such as palletizing and/or strapping and shipping normally consumes a substantial amount of time even when accelerated with curing processes, such as with warm water, low pressure steam or autoclave curing methods. Therefore, a need exists for an improved method for curing and drying cementitious blocks and brick which reduces the time required for curing thereby allowing the material to be palletized and/or strapped, shipped and otherwise utilized within a shorter period of time.

DISCLOSURE OF THE INVENTION

In accordance with the present invention, a method is provided for completing the cure of partially cured cementitious products that have been partially cured by conventional curing methods, such as low pressure steam, water vapor or autoclave curing. In accordance with another aspect of the present invention, a method of rapidly drying cured cementitious material is provided.

In one embodiment, a method of manufacturing a cementitious product is provided that includes forming the product from uncured cementitious material, moist curing the product for a period sufficient to achieve a substantial hydration of the cementitious material and thereafter applying sufficient energy in the form of microwave radiation to the cementitious material for rapid cure completion and drying.

The cementitious material preferably will be moist cured to achieve at least about 70% hydration thereof prior to subjecting the material to microwave radiation. In addition, the cementitious material may be essentially completely cured prior to subjecting the material to microwave radiation. If the cementitious material has been essentially completely cured by moist curing, then the microwave radiation energy is applied to the material in an amount sufficient to dry the material to the desired level.

DETAILED DESCRIPTION

In accordance with the present invention, a method of manufacturing a cementitious product is provided. The product or article is formed from uncured cementitious material. Any technique known to those skilled in the art can be utilized to form the product or article into the desired shape.

After the product has been formed from uncured cementitious material, the product is subjected to moist curing to achieve a substantial hydration of the cementitious material. Preferably, the cementitious material will be moist cured to achieve at least about 70% hydration thereof. Any suitable method may be used known to those skilled in the art for providing the moist curing of cementitious material.

After the cementitious material has been moist cured to the desired amount, the material is then subjected to microwave radiation for rapid cure completion and drying of the cementitious material. The amount of microwave radiation required to complete the curing and dry the cementitious material will depend upon a number of factors, including the amount of moist curing, the type of cementitious material, the total mass of the concrete units, the position of the concrete units in relation to the radiation source, and the amount of drying desired. For example, a cementitious product that has been moist cured to about 70% hydration will require substantially more microwave energy to complete the curing of and to dry the product than a similar type of cementitious product that has been substantially completely moist cured.

For one type of portland cement limestone concrete brick manufactured, after substantially completely curing the brick by a moist curing process, about 0.2 joules of microwave energy per cubic centimeter of brick applied over a period of about fifteen seconds was sufficient to achieve the desired amount of drying for allowing the brick to be palletized and/or strapped and shipped without further treatment.

The amount of moist curing in accordance with the method of the present invention will preferably range between about 70% hydration and essentially complete hydration of the cementitious material. The specific amount of moist curing to be utilized in a particular situation depends on many factors. For example, moist curing the product to a less complete hydrated phase will require the use of a greater amount of microwave radiation, thereby reducing the overall period required to produce a finished product. However, failure to achieve a sufficient amount of hydration by moist curing may cause the final product to have lower strength than desired for subsequent handling, palletizing and/or strapping.

Treatment of the cementitious material with microwave radiation will result in greater strength than the same type of cementitious material that has been cured by a wet or moist process without additional treatment or yard storage. The following example facilitates understanding this aspect of the present invention:

EXAMPLE

Tests were conducted on portland cement limestone concrete bricks that were low pressure steam cured and compression tested 60 minutes after being removed from the curing room.

A 650 watt microwave oven was utilized to apply microwave radiation energy to individual bricks for periods of time ranging between 0 seconds (no microwave radiation energy) and 300 seconds. The results of the compression tests are set forth in TABLE I.

TABLE I

| Time of Microwave Radiation (Seconds) | Compression Strength (psi) | | | |
|---|---|---|---|---|
| | Run #1 | Run #2 | Run #3 | Average |
| 0 | 1354 | 1563 | 1563 | 1493 |
| 15 | 1896 | 1979 | 2021 | 1965 |
| 30 | 1875 | 1896 | 2104 | 1958 |
| 45 | 1771 | 1854 | 1854 | 1826 |
| 60 | 2188 | 1729 | 2104 | 2007 |
| 120 | 1771 | 1771 | 2271 | 1938 |
| 180 | 1858 | 2054 | — | 1956 |
| 240 | 2017 | 1758 | 2125 | 1967 |
| 300 | 2017 | 2008 | 2017 | 2014 |

While the invention has been described with respect to preferred embodiments, it will be understood that changes, modifications and alterations are possible and such changes, modifications and alterations are intended to be covered as set forth in the appended claims.

I claim:

1. A method of manufacturing cementitious product which comprises:
   (a) forming the product from uncured cementitious material;
   (b) moist curing the product while maintaining said product free of liquid water by one of low pressure steam, water vapor or autoclave curing for a period sufficient to achieve at least the substantial hydration of said cementitious material; and
   (c) thereafter applying microwave radiation energy to said cementitious material for rapid cure completion and drying.

2. The method of claim 1 wherein said cementitious material is moist cured to achieve at least about 70% hydration thereof.

3. The method of claim 1 wherein said cementitious material is substantially completely hydrated by moist curing.

4. The method of claim 3 wherein at least about 0.2 joules of microwave radiation energy are applied per cubic centimeter of cementitious material.

5. The method of claim 4 wherein the microwave radiation energy is applied over a period of about 15 seconds.

6. The method of claim 1 wherein a plurality of cementitious products are stacked and strapped together after application of the microwave radiation energy without further treating the products.

7. The product produced by the method of claims 1, 2, 3, 4, 5 or 6.

8. A method of curing cementitious material which comprises:
   (a) moist curing the material while maintaining said material free of liquid water by one of low pressure steam, water vapor and autoclave curing for a period sufficient to achieve at least a substantial hydration of the cementitious material; and
   (b) thereafter applying microwave radiation energy to the cementitious material for rapid cure completion and drying.

9. The method of claim 8 wherein said cementitious material is moist cured to achieve at least about 70% hydration thereof.

10. The method of claim 8 wherein said cementitious material is substantially completely hydrated by moist curing.

11. The method of claim 10 wherein at least about 0.2 joules of microwave radiation energy are applied per cubic centimeter of cementitious material.

* * * * *